US008306909B2

(12) United States Patent
Singh

(10) Patent No.: US 8,306,909 B2
(45) Date of Patent: Nov. 6, 2012

(54) INTELLIGENT COLLECTIONS MODELS

(75) Inventor: Inder Preet Singh, Princeton Junction, NJ (US)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 13/419,248

(22) Filed: Mar. 13, 2012

(65) Prior Publication Data

US 2012/0173407 A1 Jul. 5, 2012

Related U.S. Application Data

(62) Division of application No. 12/900,839, filed on Oct. 8, 2010, now Pat. No. 8,135,643, which is a division of application No. 11/566,787, filed on Dec. 5, 2006, now Pat. No. 7,827,100.

(51) Int. Cl.
  *G06Q 40/00* (2006.01)
(52) U.S. Cl. ............................................ 705/38; 705/35
(58) Field of Classification Search ................ 705/8, 31, 705/38, 35, 40
  See application file for complete search history.

(56) References Cited

U.S. PATENT DOCUMENTS

| 6,098,052 A * | 8/2000 | Kosiba et al. ................... 705/40 |
| 6,912,508 B1 * | 6/2005 | McCalden et al. .............. 705/31 |
| 7,191,150 B1 * | 3/2007 | Shao et al. ...................... 705/38 |
| 2002/0116245 A1 * | 8/2002 | Hinkle et al. ..................... 705/8 |
| 2007/0156576 A1 * | 7/2007 | Imrey et al. ..................... 705/38 |
| 2007/0208640 A1 * | 9/2007 | Banasiak et al. ............... 705/35 |

* cited by examiner

*Primary Examiner* — Samica L Norman

(57) ABSTRACT

Apparatuses, computer media, and methods for analyzing credit and tax form data and determining a collections treatment type to collect revenue. A collections model is constructed to determine a collections score that is based on raw credit data and tax form data and is indicative of a debtor's propensity to pay an owed amount. The collections model includes score bands, each score band being associated with a range of credit scores. A collections score is determined from a scoring expression that is associated with a score band and that typically includes a subset of available raw credit data and tax form data. A collections treatment type is determined from a collections score. Each treatment type corresponds to a treatment action that is directed to the debtor. A collections model is constructed from historical tax data, in which score bands and scoring expressions are constructed for the collections model.

21 Claims, 12 Drawing Sheets

400

| Rank | Variable | Tax or Credit Var | Variable Description | % Contribution |
|---|---|---|---|---|
| 1 | ratio_taxowed_ctincome | Tax | Ratio of amount due at cutoff and CT income from return | 17.9% |
| 2 | RE36 | Credit | Months since most recent revolving delinquency | 5.7% |
| 3 | num_bill_payments | Tax | Number of Bill Payments (Tran type code 112) | 5.4% |
| 4 | pyr_cutoff_4_15_2004_le0 | Tax (prev year) | Good/Bad Flag of previous yr return as of 12 mths from filing dt | 5.0% |
| 5 | num_bad_checks | Tax | Number of Bad Checks | 5.0% |
| 6 | G091 | Credit | Total amount now past due | 5.0% |
| 7 | BR20 | Credit | Months since oldest bank revolving trade opened | 4.7% |
| 8 | PS134 | Credit | RATIO BANK REV BAL/CREDIT LINE | 4.7% |
| 9 | PS340 | Credit | AVERAGE BANKCARD CREDIT LIMIT | 4.6% |
| 10 | G095 | Credit | Months since most recent derogatory public record | 4.5% |
| 11 | BR21 | Credit | Months since most recent bank revolving trade opened | 4.5% |
| 12 | PS065 | Credit | NUM OF TRADES | 4.1% |
| 13 | PS082 | Credit | AGE OLDEST AUTO TRADE | 4.0% |
| 14 | PS168 | Credit | NUM TRADES W/ HMOP 2 OR GT TH | 3.7% |
| 15 | home_ownership | Tax | Flag for paid property tax | 3.7% |
| 16 | PS310 | Credit | NUM PAID JUDGEMENTS TH HH | 3.7% |
| 17 | RE35 | Credit | Average current balance of all revolving trades | 3.6% |
| 18 | PS091 | Credit | MONS SINCE OLDEST RET TRD OPENED | 3.5% |
| 19 | FI36 | Credit | Months since most recent finance installment delinquency | 3.5% |
| 20 | PS212 | Credit | NUM HMOP 03 OR GT IN LAST 12 | 3.2% |

FIG. 4

| Rank | Variable | Tax or Credit Var | Variable Description | % Contribution |
|---|---|---|---|---|
| 1 | ratio_taxowed_ctincome | Tax | Ratio of amount due at cutoff and CT income from return | 13.1% |
| 2 | PS230 | Credit | NUM TRADES CUR MOP 02 OR GT IN LAST 12 | 7.5% |
| 3 | num_bill_payments | Tax | Number of Bill Payments (Tran type code 112) | 5.7% |
| 4 | pyr_cutoff_1_15_2004_le0 | Tax | Good/Bad Flag of previous yr return as of 9 mths from filing dt | 5.5% |
| 5 | ratio_taxpaid_taxdue | Tax | Ratio of payment and total tax from return | 5.4% |
| 6 | PF36 | Credit | Months since most recent personal finance delinquency | 5.4% |
| 7 | S054 | Credit | Number of different subscribers | 5.3% |
| 8 | PS017 | Credit | TOTAL COLLECTION BALANCE | 4.7% |
| 9 | TRRG1TOT | Credit | TransUnion Recovery Model 2.0 | 4.5% |
| 10 | PS203 | Credit | NUM HMOP 02 IN LAST 12 | 4.5% |
| 11 | mths_current_address | Credit | Months at current address from credit data | 4.5% |
| 12 | MT46 | Credit | Number of mortgage trades delinquent in 6 months | 4.2% |
| 13 | PS206 | Credit | NUM HMOP 02 OR GT IN LAST 12 | 4.0% |
| 14 | G095 | Credit | Months since most recent derogatory public record | 3.8% |
| 15 | PS120 | Credit | UTILIZATION OF REVOLVING TRADES | 3.8% |
| 16 | PF21 | Credit | Months since most recent personal finance trade opened | 3.8% |
| 17 | G008 | Credit | Number of 60 day or worse ratings | 3.8% |
| 18 | OF34 | Credit | Ratio of total balance to high credit/credit limit for all other fina | 3.7% |
| 19 | PF35 | Credit | Average balance of all personal finance trades | 3.6% |
| 20 | BC20 | Credit | Months since oldest bankcard trade opened | 3.4% |

| Rank | Variable | Tax or Credit Var | Variable Description | % Contribution |
|---|---|---|---|---|
| 1 | ratio_taxowed_ctincome | Tax | Ratio of amount due at cutoff and CT income from return | 23.9% |
| 2 | num_payments | Tax | Number of Payments (Tran type code 110 &112) | 7.2% |
| 3 | pyr_cutoff_4_15_2004_le0 | Tax | Good/Bad Flag of previous yr return as of 12 mths from filing dt | 6.1% |
| 4 | PS150 | Credit | TOT BAL ON BANK INSTALL TRADES | 4.6% |
| 5 | G058 | Credit | Number of trades 30 or more days past due in last 6 months | 4.4% |
| 6 | OF21 | Credit | Months since most recent other finance trade opened | 4.3% |
| 7 | late_penalty_amt_flag | Tax | late penalty amt flag | 4.3% |
| 8 | PF20 | Credit | Months since oldest personal finance trade opened | 4.1% |
| 9 | PS340 | Credit | AVERAGE BANKCARD CREDIT LIMIT | 4.0% |
| 10 | PB34 | Credit | Ratio of total balance to high credit/credit limit for all premium | 4.0% |
| 11 | OF34 | Credit | Ratio of total balance to high credit/credit limit for all other fina | 3.8% |
| 12 | PS087 | Credit | UTILIZATION ALL AUTO TRADES | 3.7% |
| 13 | AT34 | Credit | Ratio of total current balance to high credit/credit limit for all tr | 3.6% |
| 14 | BC21 | Credit | Months since most recent bankcard trade opened | 3.4% |
| 15 | PS133 | Credit | TOT BAL BANK REV TRADES | 3.3% |
| 16 | G046 | Credit | Number of trades never 30 or more days past due | 3.3% |
| 17 | DS20 | Credit | Months since oldest department store trade opened | 3.1% |
| 18 | S059 | Credit | Number of public record and trade line derogatory items great | 3.1% |
| 19 | PS134 | Credit | RATIO BANK REV BAL/CREDIT LINE | 3.1% |
| 20 | S114 | Credit | Number of inquiries reported in past 6 months, excluding auto | 2.9% |

| Rank | Variable | Tax or Credit Var | Variable Description | % Contribution |
|---|---|---|---|---|
| 1 | ratio_taxowed_ctincome | Tax | Ratio of amount due at cutoff and CT income from return | 24.6% |
| 2 | PS080 | Credit | NUM TRADES ZERO BAL | 10.2% |
| 3 | pyr_cutoff_4_15_2004_le0 | Tax | Good/Bad Flag of previous yr return as of 12 mths from filing d | 10.2% |
| 4 | PS340 | Credit | AVERAGE BANKCARD CREDIT LIMIT | 4.6% |
| 5 | num_payments | Tax | Number of Payments (Tran type code 110 &112) | 4.6% |
| 6 | G051 | Credit | Percent of trades never delinquent | 4.2% |
| 7 | ratio_taxpaid_taxdue | Tax | Ratio of payment and total tax from return | 4.1% |
| 8 | RE36 | Credit | Months since most recent revolving delinquency | 3.4% |
| 9 | NA201TOT | Credit | TransUnion New Account 2.0 | 3.2% |
| 10 | S004 | Credit | Average number of months that trades have been open | 3.1% |
| 11 | PS275 | Credit | RATION OFHE TRADES BAL/CRED LINE | 3.0% |
| 12 | PS263 | Credit | NUM COL INQUIRES IN LAST 3 | 3.0% |
| 13 | home_ownership | Tax | Flag for paid property tax | 2.9% |
| 14 | PS268 | Credit | NUM MORT TRADES VER IN 12 | 2.9% |
| 15 | AT28 | Credit | Total high credit/credit limit | 2.8% |
| 16 | BI36 | Credit | Months since most recent bank installment delinquency | 2.7% |
| 17 | BI20 | Credit | Months since oldest bank installment trade opened | 2.7% |
| 18 | FI36 | Credit | Months since most recent finance installment delinquency | 2.6% |
| 19 | PS109 | Credit | NUM OPN FIN INSTALL W BAL > 0 | 2.5% |
| 20 | RE34 | Credit | Ratio of total current balance to high credit/credit limit for all re | 2.5% |

| Rank | Variable | Tax or Credit Var | Variable Description | % Contribution |
|---|---|---|---|---|
| 1 | ratio_taxowed_ctincome | Tax | Ratio of amount due at cutoff and CT income from return | 20.4% |
| 2 | pyr_cutoff_4_15_2004_le0 | Tax | Good/Bad Flag of previous yr return as of 12 mths from filing d | 13.5% |
| 3 | pyr_cutoff_1_15_2004_le0 | Tax | Good/Bad Flag of previous yr return as of 9 mths from filing dt | 5.1% |
| 4 | ON34 | Credit | Ratio of total current balance to high credit/credit limit for all oi | 4.5% |
| 5 | AT31 | Credit | Percentage of all trades > 75% of limit | 4.0% |
| 6 | AT35 | Credit | Average current balance of all trades | 4.0% |
| 7 | IN36 | Credit | Months since most recent installment delinquency | 4.0% |
| 8 | PS042 | Credit | NUM OF COLLECTIONS IN 12 NO MED | 3.9% |
| 9 | PS088 | Credit | UTILIZATION ALL NON AUTO TRADES | 3.9% |
| 10 | G063 | Credit | Number of trades 60 or more days past due in last 6 months | 3.9% |
| 11 | G960 | Credit | Number of non-insurance inquiries | 3.7% |
| 12 | G001 | Credit | Number of 30 day ratings | 3.6% |
| 13 | BR35 | Credit | Average balance of all bank revolving trades | 3.4% |
| 14 | PS148 | Credit | AGE OF OLDEST BANKCARD | 3.4% |
| 15 | age_s0y2 | Credit | Age from credit data | 3.3% |
| 16 | num_days_after_apr15 | Tax | Number of days filed after April 15 | 3.2% |
| 17 | PB36 | Credit | Months since most recent premium bankcard delinquency | 3.2% |
| 18 | late_penalty_amt | Tax | late penalty amount from return | 3.2% |
| 19 | PS082 | Credit | AGE OLDEST AUTO TRADE | 3.0% |
| 20 | S012 | Credit | Number of open revolving trades | 2.8% |

| Rank | Variable | Tax or Credit Var | Variable Description | % Contribution |
|---|---|---|---|---|
| 1 | ratio_taxowed_ctincome | Tax | Ratio of amount due at cutoff and CT income from return | 16.8% |
| 2 | ON36 | Credit | Months since most recent oil and national delinquency | 5.9% |
| 3 | PS219 | Credit | NUM HMOP 05 IN LAST 6 | 5.9% |
| 4 | ON34 | Credit | Ratio of total current balance to high credit/credit limit for all oi | 5.4% |
| 5 | PS120 | Credit | UTILIZATION OF REVOLVING TRADES | 4.8% |
| 6 | tax_owed | Tax | Net tax owed from return | 4.8% |
| 7 | S015 | Credit | Number of open, revolving bank trades with high credit/credit l | 4.6% |
| 8 | S070 | Credit | Number of collection trades in the past 24 months | 4.5% |
| 9 | PS055 | Credit | HIGHEST CURRBAL AMT IN 6 | 4.5% |
| 10 | OF36 | Credit | Months since most recent other finance delinquency | 4.4% |
| 11 | PS215 | Credit | NUM HMOP 04 IN LAST 12 | 4.2% |
| 12 | PB32 | Credit | Maximum balance owed on all premium bankcard trades | 4.1% |
| 13 | PS190 | Credit | NUM TRADES W/ HMOP 4 OR GT IN LAST 6 | 4.0% |
| 14 | PS080 | Credit | NUM TRADES ZERO BAL | 4.0% |
| 15 | mths_current_address | Credit | Months at current address from credit data | 3.9% |
| 16 | MT35 | Credit | Average current balance of mortgage trades | 3.8% |
| 17 | IN35 | Credit | Average balance of all installment trades | 3.8% |
| 18 | PS090 | Credit | MONS SINCE LAST RET TRD OPENED | 3.8% |
| 19 | PS262 | Credit | NUM COL INQUIRES IN LAST 12 | 3.6% |
| 20 | S040 | Credit | Highest retail high credit/credit limit | 3.6% |

FIG. 9

INTELLIGENT COLLECTIONS MODELS

RELATED APPLICATIONS

This application is a divisional of U.S. patent application Ser. No. 12/900,839, filed Oct. 8, 2010, naming Inder Preet Singh as the inventor, which is a divisional of U.S. patent application Ser. No. 11/566,787, filed Dec. 5, 2006, naming Inder Preet Singh as the inventor. These applications are incorporated herein by reference in their entirety and for all purposes.

BACKGROUND OF THE INVENTION

Revenue agencies typically have more accounts to be collected than resources to collect and resolve the accounts. Historically revenue agencies work all accounts through a single, inflexible workflow with little consideration to the debtor's willingness or ability to pay. Decisions to use outside collections services occur at the end of the process at which time the accounts are stale.

A revenue agency typically utilizes a FICO score, which is a credit score developed by Fair Isaac & Co. Credit scoring and is a method for determining the likelihood that credit users will pay their bills. Fair, Isaac began its pioneering work with credit scoring in the late 1950s and, since then, scoring has become widely accepted by lenders as a reliable means of credit evaluation. A credit score attempts to condense a borrower's credit history into a single number. However, Fair, Isaac & Co. and the credit bureaus do not reveal how the credit scores are computed. The Federal Trade Commission has ruled this approach to be acceptable. Credit scores are calculated by using scoring models and mathematical tables that assign points for different pieces of information which best predict future credit performance. Developing these models involves studying how thousands, even millions, of people have used credit. Score-Model developers find predictive factors in the data that have proven to indicate future credit performance. Models can be developed from different sources of data. Credit-bureau models are developed from information in consumer credit-bureau reports.

Credit scores analyze a borrower's credit history considering numerous factors such as:
  Late payments
  The amount of time credit has been established
  The amount of credit used versus the amount of credit available
  Length of time at present residence
  Employment history
  Negative credit information such as bankruptcies, charge-offs, collections, etc.

There are typically three FICO scores that are computed by data provided by each of the three most prevalent credit bureaus: Experian, TransUnion, and Equifax. Some lenders use one of these three scores, while other lenders may use the middle score.

The use of a credit score to determine the propensity to pay is inflexible in altering the collections model. A revenue agency, for example, may wish to tailor its collection model to better fit available data. Moreover, a revenue agency can customize its collection practices to more effectively use collections resources and to identify those accounts that will require private collections services early in the process.

BRIEF SUMMARY OF THE INVENTION

Embodiments of invention provide apparatuses, computer media, and methods for analyzing raw credit data and tax form data to determine a collections score that is indicative of debtor's (tax filer's) propensity to pay an owed amount to a revenue agency.

With one aspect of the invention, a collections model is formed from raw credit data, tax form data, and credit scores. The collections model includes a plurality of score bands, in which a score band is associated with range of credit scores.

With another aspect of the invention, a collections score is determined from a scoring expression that is associated with each score band. The scoring expression typically includes a subset of available raw credit data and tax form data. A scoring expression that is associated with a score band may utilize different variables than another scoring expression that is associated with another score band.

With another aspect of the invention, a collections treatment type for a debtor is determined from a collections score. The collections treatment type may be independent of the score band of the debtor. Each collections treatment type corresponds to a treatment action that is directed to the debtor. Moreover, the collections treatment type for a given collections score range may be modified if the revenue agency wishes to alter the collections model.

With another aspect of the invention, a collections model is constructed from historical tax data. A plurality of score bands is constructed for the collections model, where a different scoring expression is associated with each score band.

BRIEF DESCRIPTION OF THE DRAWINGS

The present invention is illustrated by way of example and not limited in the accompanying figures in which like reference numerals indicate similar elements and in which:

FIG. 4 shows variables for scoring in a first score band in accordance with an embodiment of the invention.

FIG. 5 shows variables for scoring in a second score band in accordance with an embodiment of the invention.

FIG. 6 shows variables for scoring in a third score band in accordance with an embodiment of the invention.

FIG. 7 shows variables for scoring in a fourth score band in accordance with an embodiment of the invention.

FIG. 8 shows variables for scoring in a fifth score band in accordance with an embodiment of the invention.

FIG. 9 shows variables for scoring in a sixth score band in accordance with an embodiment of the invention.

DETAILED DESCRIPTION OF THE INVENTION

Figure 1:
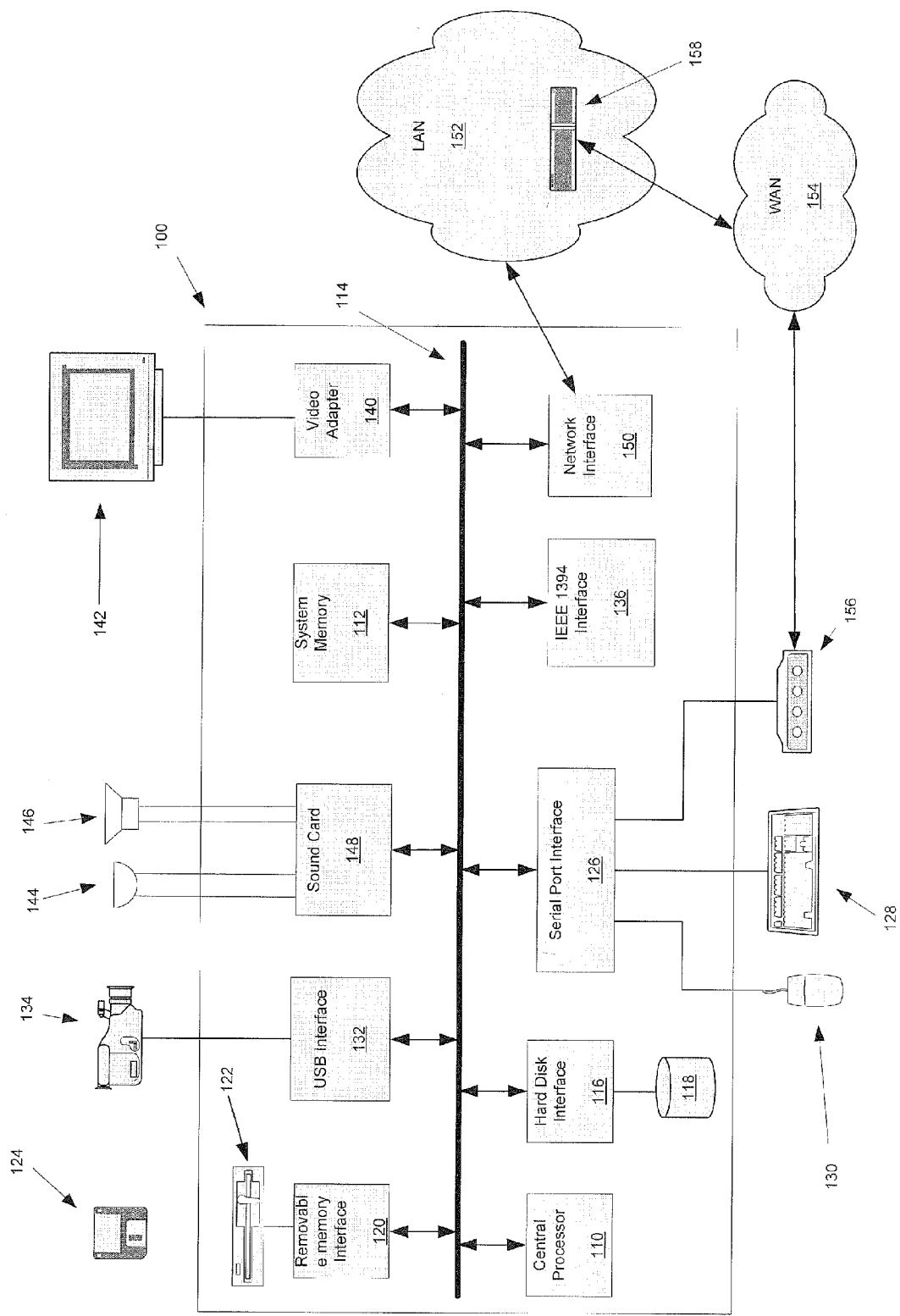
FIG. 1 shows an architecture of a computer system used in a multi-lingual telephonic service in accordance with an embodiment of the invention.
Figure 12:
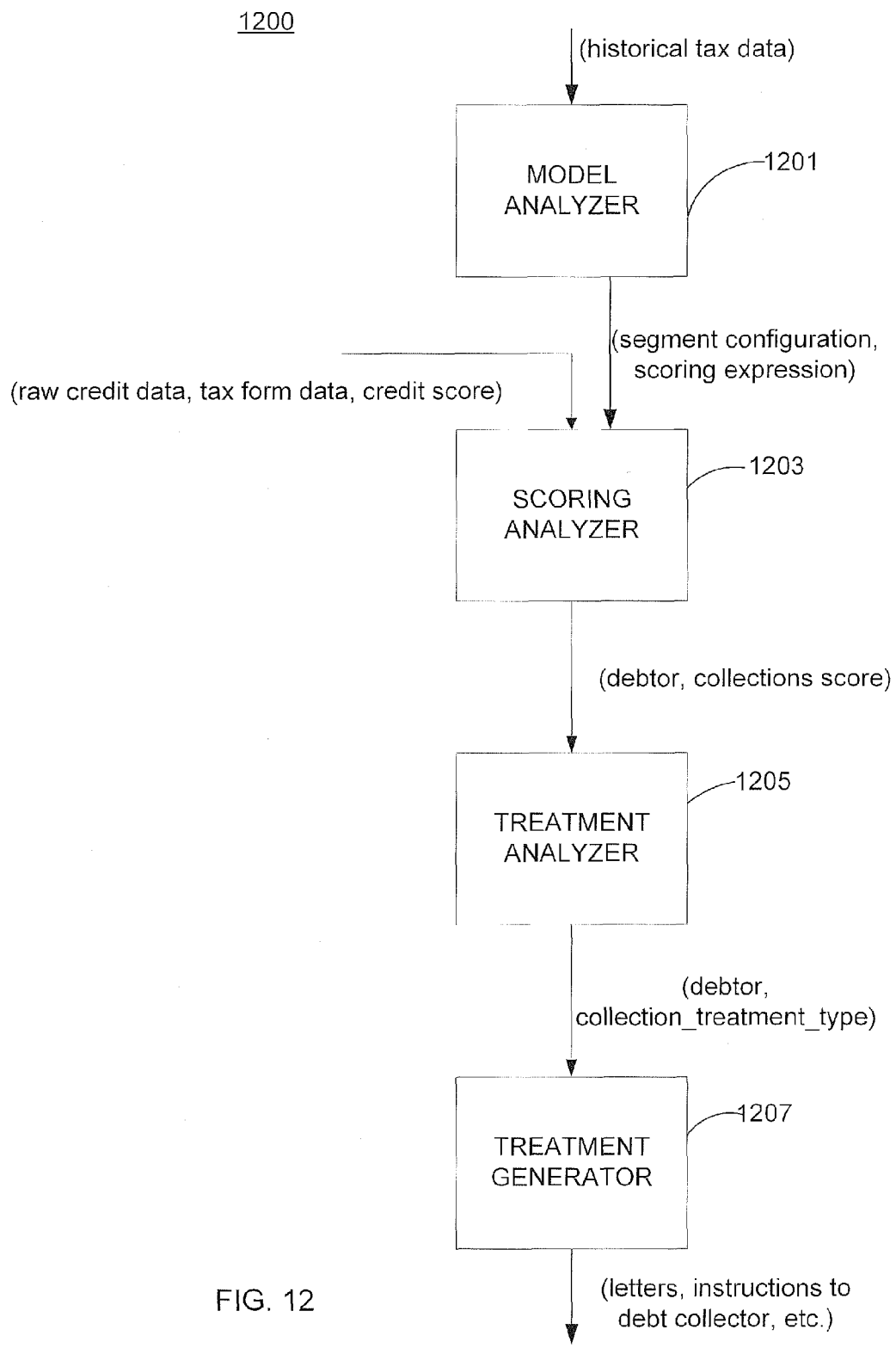
FIG. 12 shows an apparatus that analyzes raw credit data and tax form data to initiate a collections treatment action in accordance with an embodiment of the invention.

Elements of the present invention may be implemented with computer systems, such as the system 100 shown in FIG. 1. Computer 100 may be incorporated in an apparatus (as shown in FIG. 12) that analyzes input data and consequently initiates a collections treatment action for collecting revenues. Computer 100 includes a central processor 110, a system memory 112 and a system bus 114 that couples various system components including the system memory 112 to the central processor unit 110. System bus 114 may be any of several types of bus structures including a memory bus or memory controller, a peripheral bus, and a local bus using any of a variety of bus architectures. The structure of system memory 112 is well known to those skilled in the art and may include a basic input/output system (BIOS) stored in a read only memory (ROM) and one or more program modules such as operating systems, application programs and program data stored in random access memory (RAM).

Computer 100 may also include a variety of interface units and drives for reading and writing data. In particular, computer 100 includes a hard disk interface 116 and a removable memory interface 120 respectively coupling a hard disk drive 118 and a removable memory drive 122 to system bus 114. Examples of removable memory drives include magnetic disk drives and optical disk drives. The drives and their associated computer-readable media, such as a floppy disk 124 provide nonvolatile storage of computer readable instructions, data structures, program modules and other data for computer 100. A single hard disk drive 118 and a single removable memory drive 122 are shown for illustration purposes only and with the understanding that computer 100 may include several of such drives. Furthermore, computer 100 may include drives for interfacing with other types of computer readable media.

A user can interact with computer 100 with a variety of input devices. FIG. 1 shows a serial port interface 126 coupling a keyboard 128 and a pointing device 130 to system bus 114. Pointing device 128 may be implemented with a mouse, track ball, pen device, or similar device. Of course one or more other input devices (not shown) such as a joystick, game pad, satellite dish, scanner, touch sensitive screen or the like may be connected to computer 100.

Computer 100 may include additional interfaces for connecting devices to system bus 114. FIG. 1 shows a universal serial bus (USB) interface 132 coupling a video or digital camera 134 to system bus 114. An IEEE 1394 interface 136 may be used to couple additional devices to computer 100. Furthermore, interface 136 may configured to operate with particular manufacture interfaces such as FireWire developed by Apple Computer and i.Link developed by Sony. Input devices may also be coupled to system bus 114 through a parallel port, a game port, a PCI board or any other interface used to couple and input device to a computer.

Computer 100 also includes a video adapter 140 coupling a display device 142 to system bus 114. Display device 142 may include a cathode ray tube (CRT), liquid crystal display (LCD), field emission display (FED), plasma display or any other device that produces an image that is viewable by the user. Additional output devices, such as a printing device (not shown), may be connected to computer 100.

Sound can be recorded and reproduced with a microphone 144 and a speaker 166. A sound card 148 may be used to couple microphone 144 and speaker 146 to system bus 114. One skilled in the art will appreciate that the device connections shown in FIG. 1 are for illustration purposes only and that several of the peripheral devices could be coupled to system bus 114 via alternative interfaces. For example, video camera 134 could be connected to IEEE 1394 interface 136 and pointing device 130 could be connected to USB interface 132.

Computer 100 can operate in a networked environment using logical connections to one or more remote computers or other devices, such as a server, a router, a network personal computer, a peer device or other common network node, a wireless telephone or wireless personal digital assistant. Computer 100 includes a network interface 150 that couples system bus 114 to a local area network (LAN) 152. Networking environments are commonplace in offices, enterprise-wide computer networks and home computer systems.

A wide area network (WAN) 154, such as the Internet, can also be accessed by computer 100. FIG. 1 shows a modem unit 156 connected to serial port interface 126 and to WAN 154. Modem unit 156 may be located within or external to computer 100 and may be any type of conventional modem such as a cable modem or a satellite modem. LAN 152 may also be used to connect to WAN 154. FIG. 1 shows a router 158 that may connect LAN 152 to WAN 154 in a conventional manner.

It will be appreciated that the network connections shown are exemplary and other ways of establishing a communications link between the computers can be used. The existence of any of various well-known protocols, such as TCP/IP, Frame Relay, Ethernet, FTP, HTTP and the like, is presumed, and computer 100 can be operated in a client-server configuration to permit a user to retrieve web pages from a web-based server. Furthermore, any of various conventional web browsers can be used to display and manipulate data on web pages.

The operation of computer 100 can be controlled by a variety of different program modules. Examples of program modules are routines, programs, objects, components, data structures, etc., that perform particular tasks or implement particular abstract data types. The present invention may also be practiced with other computer system configurations, including hand-held devices, multiprocessor systems, microprocessor-based or programmable consumer electronics, network PCS, minicomputers, mainframe computers, personal digital assistants and the like. Furthermore, the invention may also be practiced in distributed computing environments where tasks are performed by remote processing devices that are linked through a communications network. In a distributed computing environment, program modules may be located in both local and remote memory storage devices.

An embodiment of the invention supports the development of unique analytic models to score debtors (i.e., tax filers who owe money) with outstanding accounts receivable that are owed to government revenue agencies. The scores generated by the collections model represent the propensity of a debtor to pay and also provide insight into the level of effort that will be required to collect the debt by the revenue agency. Collection models may blend demographic and financial information maintained by the revenue agency with commercial data that is reflective of a debtor's ability to pay and credit history. While a revenue agency is typically a governmental organization, revenue collections can be performed by a private organization that has been contracted by a government (Federal, state, or local). In such a case, required tax and credit information is made available to the private agency with proper security measures.

With the prior art, collections models for revenue agencies typically use only internal revenue agency data. With an embodiment of the invention, collections models involve the blending of the internal revenue agency data and the use of commercial financial and credit data. The final collections model may provide a significant improvement in identifying receivables that debtors are more likely to pay during the collections process. The final collections model is typically more predictive compared to FICO-only model as well as tax data-only model. Both tax form data and credit data are often very predictive in explaining payment behavior. Those who have good credit history are also good tax payers. For example, the ratio of tax still owed and income (corresponding to ratio_taxowed_ctincome as will be discussed) is a predictive tax variable—those with higher ratio are less likely to pay.

Figure 2:
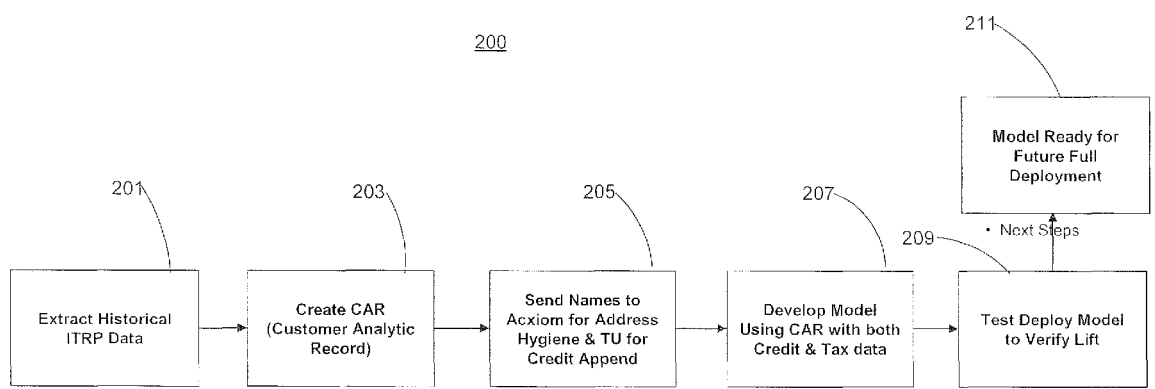
FIG. 2 shows a process for modeling revenue collections in accordance with an embodiment of the invention.

FIG. 2 shows process 200 for modeling revenue collections in accordance with an embodiment of the invention. Process 200 demonstrates quantitative benefits of using a collections model for prioritizing receivable cases. A collections model is built from developed datasets. With an embodiment of the invention, process 200 provides a test-deploy collections model as a proof-of-concept for developing a business case for a state government.

With module 201, client customer data is blended with credit history data and other data as required to fulfill the specific requirements of a collections model. In an embodiment of the invention, Module 201 extracts historical individual tax data for the State of Connecticut (CT) in the 2002 and 2003 tax years. Payment behavior is primarily modeled on 2003 tax data to predict payment in the 2003 year. Prior tax year's (2002) Paid/Not-Paid flag is also used for additional predictive power.

These data are combined in a database record called the Customer Analytic Record (CAR) by module 203. U.S. Pat. No. 7,047,251 and U.S. application Ser. No. 11/147,034, to Kenneth L. Reed, et al., ('251 and '034, respectively) are incorporated herein by reference. The '251 and '034 references disclose a system and method for creating virtual "flat" customer records derived from database customer data that may be used as standardized input for analytical models. A Customer Analytic Record ("CAR") application may be created as a database object to extract, transform, and format the customer data needed for customer segmentation and predictive modeling. The CAR may be a set of database "views" that are defined using virtual stored queries and enabled using capabilities of a data base management system and a structured query language. The CAR is typically a virtual "flat" record of the customer data needed for customer analytics. The customer data may be extracted by running one or more SQL queries against the database view(s). The CAR application may dynamically calculate additional variables using predetermined transformations, including custom transformations of an underlying behavior. If additional variables are created, the CAR may be modified to include the additional variables. The CAR is often a dynamic view of the customer record that changes whenever any update is made to the database. The definition of the CAR provides documentation of each data element available for use in models and analytics.

Module 203 creates a CAR table that is used as model input data set to drive the modeling effort. (With an embodiment, module 203 determined tax-filers who owed $50 or more on the cutoff date. The tax filers who owed less than $50 were dropped to provide sharper contrast.) Module 203 rolls up (accumulates) transactional tax data for the identified tax filers (e.g., until the cutoff date of Jul. 15, 2004) to one record per tax filer and creates derived variables-like ratios. Inferred "Goods" (Payers) correspond to tax filers who paid in a performance window of 9 months and "Bads" (Non-Payers) correspond to tax filers who did not pay in the performance window. Module 203 appends credit attributes to each record. (In an embodiment, more than 850 credit attributes provided by TransUnion were appended, in which TransUnion was able to match 98% of names for credit data.)

Module 205 provides address hygiene on the historical tax data (e.g., for the years 2002 and 2003) so that latest and correct address information is associated with the names of tax payers. In an embodiment of the invention, a data provider e.g., Acxiom Corporation, verifies address information with the names of the identified tax payers. Enhanced address accuracy and completeness via Acxiom's address hygiene process typically results in improved targetablity. Name and address information is then sent to a credit bureau, e.g., TransUnion for credit information. Credit information may include credit scores and raw credit information. Because historical tax information is being analyzed, the credit information typically corresponds to the same timeframe (e.g., for the years 2002 and 2003 in this example).

Module 207 obtains the raw credit data, historical tax data, and credit scores from module 205 to form a collections model using an application developed on the CAR. (Raw data, sometimes called source data or atomic data, is data that has not been processed for meaningful use and that has been collected but not formatted or analyzed. Raw data often is collected in a database, where the raw can be analyzed and made useful for an application.) Modeling activities begin after CAR is available. Preliminary data analysis for basic checks and data validity may be performed. With an embodiment, module 207 performs decision tree segmentation using a statistical analysis package to analyze credit scores (e.g., SAS/STAT software) to find sufficiently differentiated segments (score bands) and creates a separate segment model for each score band (segment), thus increasing the overall predictive power.

The collections model may be dynamically retrained prior to use in order to capture the latest information available. This approach is different from the typical static credit model approach where the models and the data variables are held constant. In this case, the collections model and the data are allowed to change.

Module 207 creates a collections model using tax-return and credit data that will identify and rank all future receivables on a likelihood of payment during collections process. Collections scores generated by the collections model will be used to rank receivables—a higher score implies that creditor is more likely to pay compared to creditor with a lower score. On the basis of collections scores, differentiated collections treatments can be designed and optimized over time for each risk score band of the collections model.

With an embodiment of the invention, segment modeling is performed using a KXEN data mining tool. The KXEN tool divides data into estimation (75%) and validation (25%) subsamples, where validation results verify robustness/stability of the collections model. The KXEN tool differentiates between behavior of "good" and "bad" tax filers. The KXEN tool mines more than 1,000 tax and credit variables and identified attributes that are predictive in explaining payment behavior. The KXEN tool generates automated final model equations (scoring expressions) that is used to score tax filers who still owe tax-dues to find individuals who are most likely to pay owed amounts. With an embodiment of the invention, a scoring expression is a statistical regression equation determined by the statistical tool. The regression equation typically includes only the relevant variables from more than 1000 mined variables.

Module 209 tests and verifies the collections model developed by module 207. In an embodiment, module 209 extracts receivables for the 2004 tax year and determines the collections scores using the collections model. Treatment actions based on the determined treatment type are directed test groups. The "Goods" (those who pay) and the "Bads" (those who do not pay within a predetermined time duration (performance window)) are measured.

One the collections model has been developed by module 207 and verified by module 209, module 211 prepares the collection model for the targeted revenue agency. For example, the collection model may be implemented as a computer-readable medium having computer-executable instructions and distributed to a revenue agency over a secure communications channel (e.g., LAN 152 as shown in FIG. 1) or as an apparatus that utilizes a computer platform, e.g., computer 100.

Figure 3:
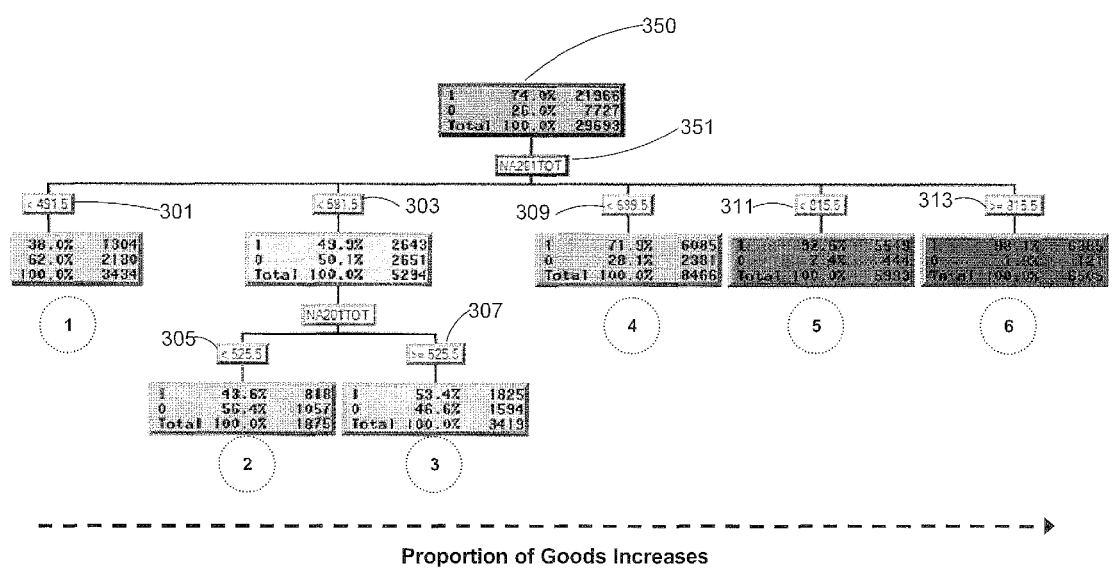
FIG. 3 illustrates a process for assigning a debtor to a score band in accordance with an embodiment of the invention.

FIG. 3 illustrates process 300 for configuring a plurality of score bands in a collections model in accordance with an embodiment of the invention. In an embodiment, process 300 is performed by module 207 as shown in FIG. 2. A sampled population 350 of debtors (using historical tax data as previously discussed) is analyzed to configure a plurality of score bands (segments) in accordance with desired statistical characteristics. The tree based algorithm finds the top variable which divides the debtors into segments with similar percentage of "goods" and "bads." Sampled population includes a combination of "Goods" (21966 debtors or 74%) and "Bads" (7727 debtors or 26%). As will be further discussed, the debtors are assigned to one of the score bands based on credit score 351 (NA201TOT) that is built and produced by TransUnion (TU). However, other embodiments may use other scores, e.g., another credit score or a customized score that is determined from a combination of tax form data and raw credit data.

Each debtor of the sampled population of debtors is assigned to one of six score bands (segments) based on the associated credit score 351. Debtors that satisfy criterion 301 (NA201TOT<491.5) are assigned to score band 1. Debtors that satisfy criteria 303 and 305 (491.5<=NA201TOT<525.5) are assigned to score band 2, and debtors that satisfy criteria 303 and 307 (525.5<=NA201TOT<581.5) are assigned to score band 3. Similarly, debtors are assigned to score bands 4, 5, and 6 that satisfy criteria 309, 311, and 313, respectively.

FIGS. 4-9 show configurations for segment models for each of the score bands that are determined by process 300 as performed by module 207 when constructing a collections model. As previously discussed, a scoring expression is determined for each score band (segment). Even though over a thousand credit and tax variables are available, the scoring expressions shown in FIGS. 4-9 are limited to twenty variables in order to reduce calculations for determining a desired collections objective. In general, a scoring expression (given that the $j^{th}$ score band is selected) may be expressed as:

$$\text{collections\_score} = \sum_{i=1}^{N} w_{i,j} \times v_{i,j} \quad \text{(EQ. 1)}$$

where N is the numbers of variables used in a scoring expression, $w_{i,j}$ is the weight for the $i^{th}$ variable of the $j^{th}$ score band, and $v_{i,j}$ is the value of the $i^{th}$ variable of the $j^{th}$ score band.

With an exemplary embodiment of the invention, module 207 selects 20 variables for each scoring expression. However, with other embodiments module 207 may select a different number of variables, where the variables vary with different scoring expressions.

FIG. 4 shows scoring expression 400 for the first score band as shown in FIG. 3 in accordance with an embodiment of the invention. Scoring expression 400 utilizes twenty variables selected from over one thousand raw credit data and tax form data. For example, variable 401 (ratio_taxedowed_ctincome) is considered as having the greatest importance and is accordingly given the greatest weight 405 (17.9%). Variable 403 (RE36) has the next greatest importance and is given weight 407 (7.7%).

FIG. 5 shows scoring expression 500 for the second score band as shown in FIG. 3 in accordance with an embodiment of the invention. Scoring expression 500 utilizes twenty variables selected from over one thousand raw credit data and tax form data. For example, variable 401 (ratio_taxedowed_ctincome) is considered as having the greatest importance and is accordingly given the greatest weight 503 (13.1%). Variable 501 (PS230) has the next greatest importance and is given weight 505 (7.5%). In the exemplary embodiment, scoring expressions 400 and 500 have one common variable (variable 401) with the remaining variables being different (e.g. variables 403 and 501).

FIG. 6 shows scoring expression 600 for the third score band as shown in FIG. 3 in accordance with an embodiment of the invention. Scoring expression 600 utilizes twenty variables selected from over one thousand raw credit data and tax form data. With an embodiment of the invention, the majority of the variables of scoring expression 600 are different from the variables of the other scoring expressions 400, 500, 700, 800, and 900.

FIG. 7 shows scoring expression 700 for the fourth score band as shown in FIG. 3 in accordance with an embodiment of the invention. Scoring expression 700 utilizes twenty variables selected from over one thousand raw credit data and tax form data. As shown in FIGS. 4-9, variable 401 (ratio_taxowed_ctincome) is commonly used by scoring expressions 400-900. Moreover, some of the variables of scoring expression 700 may be used by some of the other scoring expressions. For example, variable 701 (home_ownership) is used by scoring expression 400 but not by the other scoring expressions.

FIG. 8 shows scoring expression 800 for the fifth score band as shown in FIG. 3 in accordance with an embodiment of the invention. Scoring expression 800 utilizes twenty variables selected from over one thousand raw credit data and tax form data. The fifth score band contains debtors having a very low credit risk with a small proportion of "Bads."

FIG. 9 shows scoring expression 900 for the sixth score band as shown in FIG. 3 in accordance with an embodiment of the invention. Scoring expression 900 utilizes twenty variables selected from over one thousand raw credit data and tax form data. The sixth score band contains debtors having the lowest credit risk with almost no "Bads."

As previously discussed, a collections model is constructed as shown in FIGS. 2-9. The collections model can then be used by a revenue agency to determine and initiate collections treatment for debtors.

Figure 10:
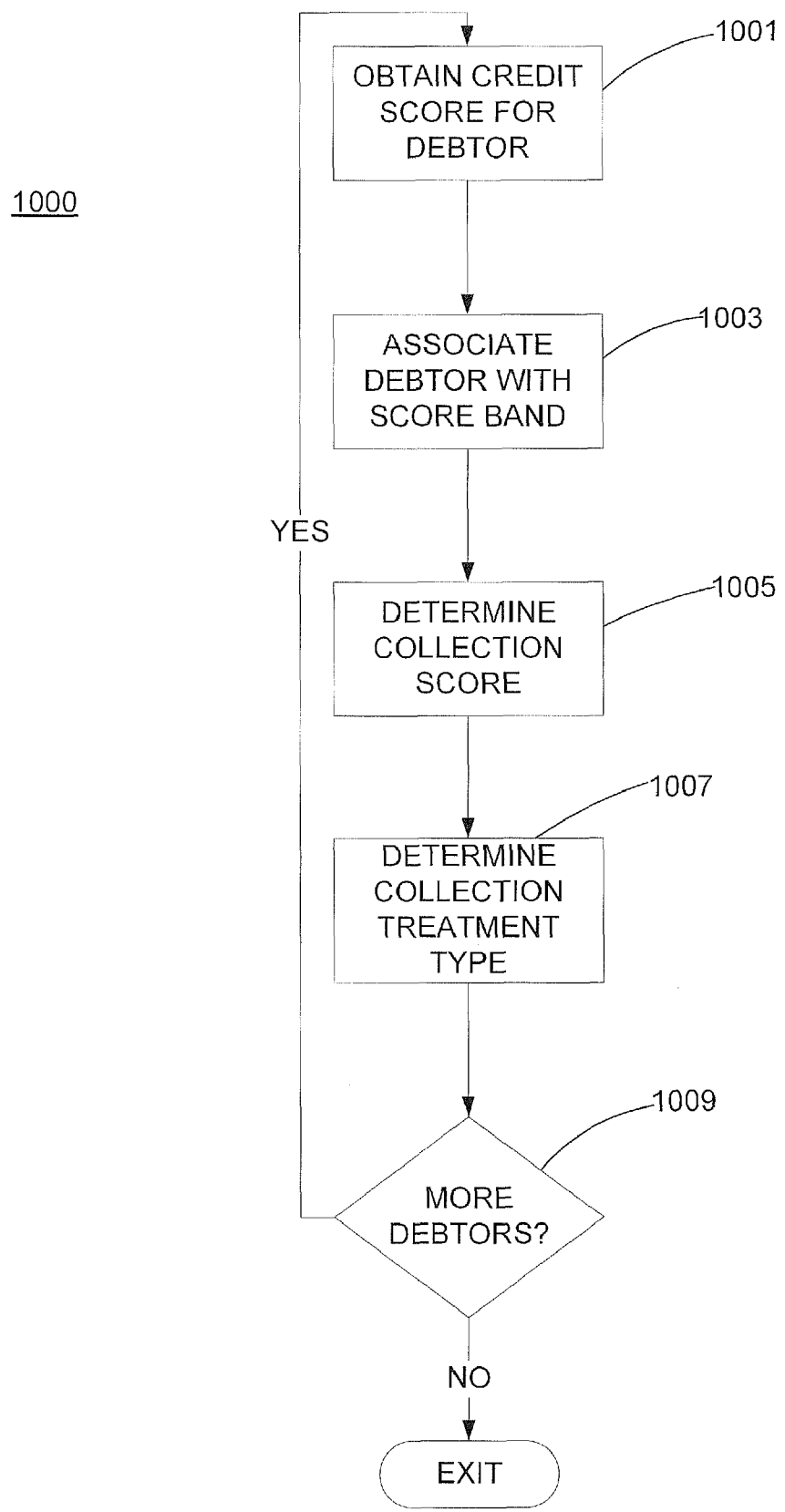
FIG. 10 shows a process for determining a collections score for a debtor in accordance with an embodiment of the invention.

FIG. 10 shows a process 1000 for determining a collections score for a debtor in accordance with an embodiment of the invention. The collections scores, as generated by collections models, enable revenue agencies to better align workload with workforce and other available resources. Enhanced efficiency is accomplished by prioritizing accounts based upon the collections score. Accordingly, the most likely to pay receive "softer" collection approaches and the least likely to pay receive more assertive treatments earlier in the collections process. The prioritization of accounts identifies the most difficult debtors to collect accounts. These accounts can be forwarded to private collections services at the onset when these accounts are still fresh. It is expected that using the collections score to prioritize and assign accounts may increase revenue derived from accounts receivable collections by 3% to 7%.

Procedure 1001 obtains a credit score for a debtor after the collections model has been constructed by process 200 (as shown in FIGS. 2 and 3). In an embodiment of the invention, NA201TOT is a credit score that is built and produced by TransUnion (TU) and that is utilized in an embodiment of the invention. (TransUnion is a credit bureau as previously discussed.) NA201TOT is also called TU New Account Score. As performed by procedure 1003, a tax filer is classified into one of six segments on the basis of their NA201TOT score. Each of the six segments (score bands) has a separate model equation (scoring expression). Procedure 1005 uses the associated scoring expression to determine the collections score. If a debtor is assigned to segment '2' on the basis of debtor's NA201TOT score, then collections model '2' equation is used to determine the collections score for the debtor. With an embodiment of the invention, procedure 1007 determines the collections treatment type that is based on a debtor's collections score (also called ATCS score), irrespective of the debtor's segment score band) assignment. In an embodiment, if two debtors have the same collections score but are assigned to different segments, the collections treatment type is the same. (However, embodiments of the invention may associate different collections treatment types for the same collections score for different score bands, i.e., the collection treatment type may be dependent on the score band.) As an example, debtor_1 has an ATCS score of 0.88. Debtor_2 has an ATCS score of 0.14. Debtor_1 has high score, i.e., is very likely to pay any owed amount, so the revenue agency just sends a notice letter (Treatment Type A). Corresponding action actions are initiated from the determined treatment type. Debtor_2 has low score, i.e., is not likely to pay, so the revenue agency sends the debtor a strongly worded letter. If no payment is received within 21 days, for example, the revenue agency sends another strong letter. If payment still not received after second reminder, the revenue agency refers debtor_2 to a debt collector. (Treatment Type C) An exemplary collection rule set is:

If ATCS>=0.75 then initiate treatment A
If 0.4<=ATCS<0.75 then initiate treatment B
If ATCS<0.4 then initiate treatment C Collections score bands and treatments may continuously change and improve over time. (For example one may "tweak" treatment type A. As another example, one may change the cutoff from 0.75 cutoff to 0.7). With the above embodiment, NA201TOT is used for scoring any debtor. Using NA201TOT provides additional power to collections models. However, embodiments of the invention may build models without NA201TOT. For example, a collections score may be determined from a combination of tax form data and raw credit data. Procedures 1001-1007 are repeated if additional debtors are to be processed as determined by procedure 1009.

Figure 11:
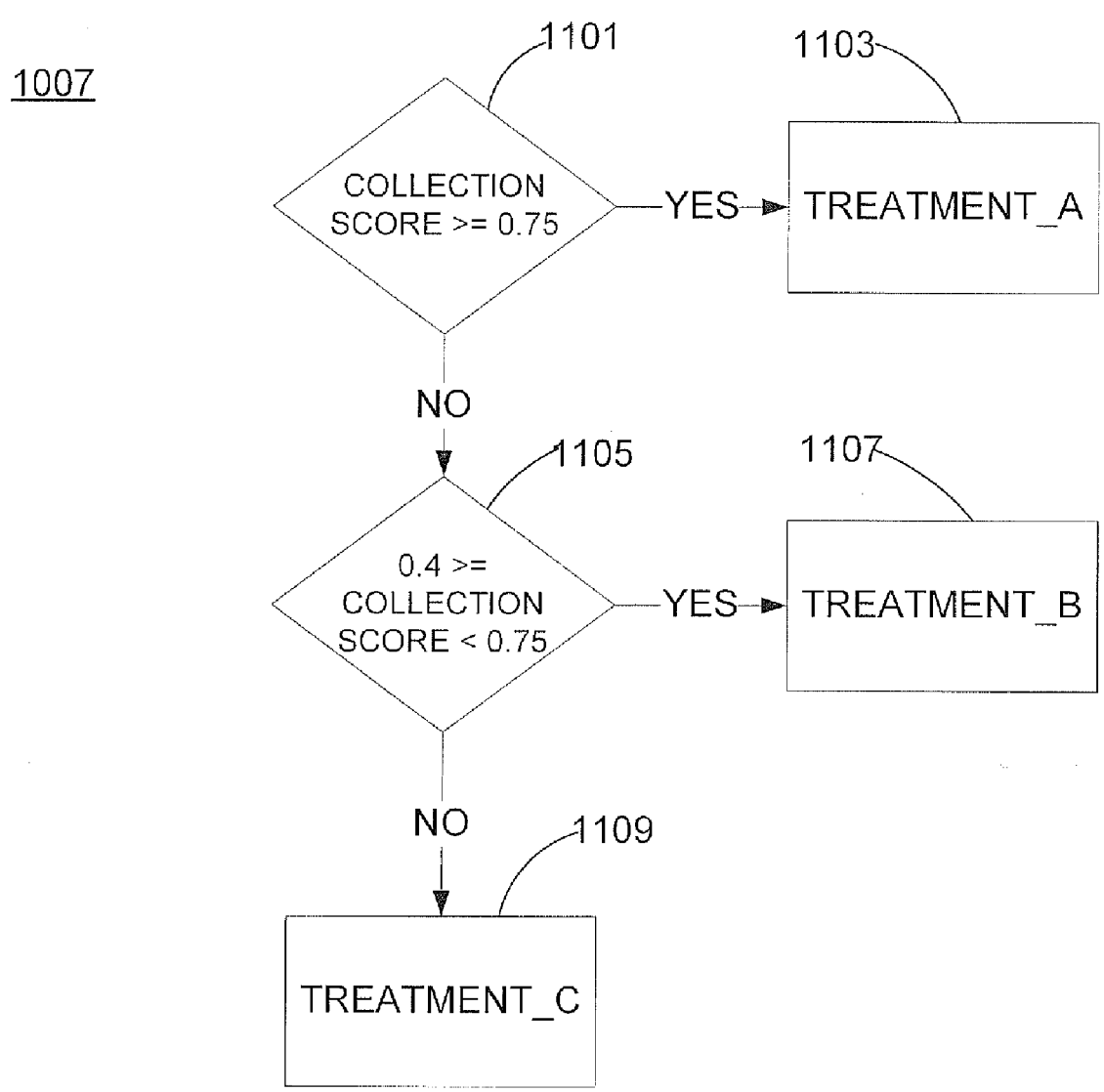
FIG. 11 shows a process for determining a collections treatment type from a collections score in accordance with an embodiment of the invention.

FIG. 11 shows process 1007 (as shown in FIG. 10) for determining a collections treatment type from a collections score in accordance with an embodiment of the invention. In step 1101, if the collections score (as determined by procedure 1005) is greater or equal to 0.75, collection treatment type_A 1103 is selected. In step 1105, the collections score is between 0.75 and 0.4, collection treatment type_B 1107 is selected. Otherwise, collection treatment type_C 1109 is selected.

FIG. 12 shows apparatus 1200 that analyzes raw credit data and tax form data to initiate a collections treatment action in accordance with an embodiment of the invention. Model analyzer 1201 constructs a collection model using historical tax data performing process 200 as previously discussed. Model analyzer 1201 provides the configuration for a plurality of score bands (segments) and associated scoring expressions to scoring analyzer 1203. Scoring analyzer 1203 consequently determines the collections score for the debtor being processed. Treatment analyzer 1205 determines the collection treatment type from the collections score. Consequently, treatment generator 1207 initiates treatment action (e.g., letters to debtors and instructions to a debt collector) to the directed debtor.

As can be appreciated by one skilled in the art, a computer system (e.g., computer 100 as shown in FIG. 1) with an associated computer-readable medium containing instructions for controlling the computer system may be utilized to implement the exemplary embodiments that are disclosed herein. The computer system may include at least one computer such as a microprocessor, a cluster of microprocessors, a mainframe, and networked workstations.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. An apparatus for determining a collections treatment type, said apparatus comprising:
a scoring analyzer operable to select a score band based on a credit score associated with a debtor, wherein said scoring analyzer is further operable to determine a collections score based on raw credit data and a first scoring expression of a plurality of different scoring expressions, wherein said first scoring expression is associated with said score band, wherein said first scoring expression utilizes a first variable, and wherein a second scoring expression associated with a second score band utilizes a second variable; and
a treatment analyzer operable to determine said collections treatment type based on said collections score.

2. The apparatus of claim 1 further comprising:
a treatment generator operable to initiate a treatment action based on said collections treatment type, wherein said treatment action is associated with said debtor.

3. The apparatus of claim 1, wherein said treatment analyzer is further operable to determine said collections treatment type based on said collections score and said score band.

4. The apparatus of claim 1 further comprising:
a model analyzer operable to configure a plurality of score bands, wherein said plurality of score bands comprises said score band, and wherein each score band of said plurality of score bands is associated with a respective credit score range and a respective scoring expression.

5. The apparatus of claim 1, wherein said first scoring expression utilizes a first weight associated with said first variable, and wherein said second scoring expression utilizes a second weight associated with said second variable.

6. The apparatus of claim 1, wherein said first and second variables are different.

7. The apparatus of claim 1, wherein said first and second variables are the same.

8. A method of determining a collections treatment type, said method comprising:
selecting, by a computer processor, a score band based on a credit score associated with a debtor;
determining, by the computer processor, a collections score based on raw credit data and a first scoring expression of a plurality of different scoring expressions, wherein said first scoring expression is associated with said score band, wherein said first scoring expression utilizes a first variable, and wherein a second scoring expression associated with a second score band utilizes a second variable; and determining, by the computer processor, said collections treatment type based on said collections score.

9. The method of claim 8 further comprising:
initiating a treatment action based on said collections treatment type, wherein said treatment action is associated with said debtor.

10. The method of claim 8, wherein said determining said collections treatment type further comprises determining said collections treatment type based on said collections score and said score band.

11. The method of claim 8 further comprising:
configuring a plurality of score bands, wherein said plurality of score bands comprises said score band, and wherein each score band of said plurality of score bands is associated with a respective credit score range and a respective scoring expression.

12. The method of claim 8, wherein said first scoring expression utilizes a first weight associated with said first variable, and wherein said second scoring expression utilizes a second weight associated with said second variable.

13. The method of claim 8, wherein said first and second variables are different.

14. The method of claim 8, wherein said first and second variables are the same.

15. A computer-readable storage medium having computer-readable program code embodied therein for causing a computer system to perform a method of determining a collections treatment type, said method comprising:
selecting a score band based on a credit score associated with a debtor;
determining a collections score based on raw credit data and a first scoring expression of a plurality of different scoring expressions, wherein said first scoring expression is associated with said score band, wherein said first scoring expression utilizes a first variable, and wherein a second scoring expression associated with a second score band utilizes a second variable; and
determining said collections treatment type based on said collections score.

16. The computer-readable storage medium of claim 15, wherein said method further comprises:
initiating a treatment action based on said collections treatment type, wherein said treatment action is associated with said debtor.

17. The computer-readable storage medium of claim 15, wherein said determining said collections treatment type further comprises determining said collections treatment type based on said collections score and said score band.

18. The computer-readable storage medium of claim 15, wherein said method further comprises:
configuring a plurality of score bands, wherein said plurality of score bands comprises said score band, and wherein each score band of said plurality of score bands is associated with a respective credit score range and a respective scoring expression.

19. The computer-readable storage medium of claim 15, wherein said first scoring expression utilizes a first weight associated with said first variable, and wherein said second scoring expression utilizes a second weight associated with said second variable.

20. The computer-readable storage medium of claim 15, wherein said first and second variables are different.

21. The computer-readable storage medium of claim 15, wherein said first and second variables are the same.

* * * * *